(12) United States Patent
Muench et al.

(10) Patent No.: US 10,925,211 B2
(45) Date of Patent: Feb. 23, 2021

(54) SELF-LEARNING SYSTEM THAT TAKES INTO ACCOUNT CORRECTIVE INPUTS FOR AUTOMATIC CONTROL OF AN OPERATING PARAMETER OF A CROP TRANSPORT OR PROCESSING DEVICE

(71) Applicant: DEERE & COMPANY, Moline, IL (US)

(72) Inventors: Philipp Muench, Kaiserslautern (DE); Tobias Peschke, Neustadt An der Weinstrasse (DE)

(73) Assignee: Deere & Company, Moline, IL (US)

( * ) Notice: Subject to any disclaimer, the term of this patent is extended or adjusted under 35 U.S.C. 154(b) by 331 days.

(21) Appl. No.: 15/980,949

(22) Filed: May 16, 2018

(65) Prior Publication Data
US 2018/0332767 A1 Nov. 22, 2018

(30) Foreign Application Priority Data
May 18, 2017 (DE) .................... 10 2017 208 442.1

(51) Int. Cl.
*A01D 41/127* (2006.01)
*A01D 57/04* (2006.01)
*G06N 3/08* (2006.01)

(52) U.S. Cl.
CPC .......... *A01D 41/127* (2013.01); *A01D 57/04* (2013.01); *G06N 3/08* (2013.01)

(58) Field of Classification Search
CPC ......... A01D 41/127; A01D 57/04; G06N 3/08
See application file for complete search history.

(56) References Cited

U.S. PATENT DOCUMENTS 6,330,502 B1 12/2001 Cetinkunt et al.
7,872,587 B2 * 1/2011 Hindryckx ........... A01D 41/127
340/684

(Continued)

FOREIGN PATENT DOCUMENTS

DE 29519842 U1 2/1996
DE 10122672 A1 12/2001

(Continued)

OTHER PUBLICATIONS

European Search Report issued in counterpart application No. 18171230.8 dated Oct. 8, 2018. (5 pages).

*Primary Examiner* — Kira Nguyen

(57) ABSTRACT

A system for automatic control of an operating parameter of a crop transport or processing device of an agricultural harvesting machine includes a sensor configured to detect at least one property of a crop or a parameter affected by the operating property and a control device disposed in communication with the sensor to receive signals therefrom. The control device is operable by means of the signals from the sensor using an algorithm to determine successive control signals for control of an actuator. The control signals affect the operating parameter of the crop transport or processing device that interacts with the sensed crop. An operator interface is included for input of corrective inputs for the operating parameter. The control device is connected to the interface and is operable to override the control signals sent to the actuator by means of the received corrective inputs.

19 Claims, 2 Drawing Sheets

(56) References Cited

U.S. PATENT DOCUMENTS

| | | | | |
|---|---|---|---|---|
| 2003/0216158 | A1* | 11/2003 | Bischoff | A01D 41/127 |
| | | | | 460/6 |
| 2013/0197767 | A1* | 8/2013 | Lenz | A01D 41/127 |
| | | | | 701/50 |
| 2017/0032473 | A1* | 2/2017 | Koch | A01D 41/06 |
| 2019/0150357 | A1* | 5/2019 | Wu | G06T 7/0004 |

FOREIGN PATENT DOCUMENTS

| | | |
|---|---|---|
| DE | 10329932 A1 | 2/2005 |
| DE | 102008043716 A1 | 5/2010 |
| DE | 102011017621 A1 | 10/2012 |
| DE | 102011085380 A1 | 5/2013 |
| EP | 0928554 A1 | 7/1999 |
| EP | 1269823 A1 | 1/2003 |
| EP | 1277388 A1 | 1/2003 |
| EP | 1371278 A2 | 12/2003 |
| EP | 1495663 A1 | 1/2005 |
| EP | 2143316 A1 | 1/2010 |
| EP | 2510777 A1 | 10/2012 |
| EP | 2517549 A1 | 10/2012 |
| EP | 2586286 A1 | 5/2013 |
| EP | 2681984 A1 | 1/2014 |
| EP | 3141102 A1 | 3/2017 |

* cited by examiner

SELF-LEARNING SYSTEM THAT TAKES INTO ACCOUNT CORRECTIVE INPUTS FOR AUTOMATIC CONTROL OF AN OPERATING PARAMETER OF A CROP TRANSPORT OR PROCESSING DEVICE

RELATED APPLICATIONS

This application claims priority to German Patent Application Ser. No. 102017208442.1, filed May 18, 2017, the disclosure of which is hereby incorporated by reference in its entirety.

FIELD OF THE DISCLOSURE

The present disclosure relates to a system for automatic control of an operating parameter of a crop transport or processing device of an agricultural harvesting machine, and in particular to a system for automatic control of an operating parameter of a crop transport or processing device of an agricultural harvesting machine including a sensor to detect at least one property of the crop or a parameter affected by the property, a control device which can be operated to determine successive control signals to control an actuator that affects the operating parameter of the crop transport or processing device, and an interface for input of corrective inputs for the operating parameter by an observer monitoring the operating result of the crop transport or processing device, where the control device is connected to the interface and can be operated to override the control signals sent to the actuator by means of the received corrective inputs, and a harvesting machine outfitted therewith, and a corresponding method.

BACKGROUND

Agricultural combine harvesters are used in the harvesting of grain to harvest plants grown on a field by means of a crop head, to transport the plants into the combine harvester by means of an inclined conveyor, and to thresh it there. The threshed crop is then processed further by a separator. The grain obtained in the threshing and separating process is cleaned in a cleaning device and deposited in a grain tank, from which it is, in the end, unloaded to a transport vehicle.

In the case of a combine harvester, a number of operating parameters of the crop transport elements and crop processing elements are not firmly set, but rather are adjustable, in order to allow them to be matched to the crop species and the relevant harvesting conditions. Besides the propulsive speed of the combine harvester, examples are the cutting height of its cutter head, the rotary speed and vertical and horizontal position of a reel, the threshing drum speed and the threshing concave clearance of a tangential or axial threshing unit, and cleaning settings such as the blower speed and sieve openings of the upper and lower sieve. The settings of a straw chopper can also possibly be varied. Without automation an operator would depend on his experience or on the relevant manuals to be able to make the best possible adjustments and to be able to operate the combine harvester, which, however, is hardly possible for untrained personnel, as are used in many cases in harvesting, for lack of experience.

This is why automations of many areas of the combine harvester were proposed in the past including, for example, height control of a reel (EP 2 681 984 A1) which is based on sensor values for the crop height and for the current height of the reel and automatically adjust the reel height. Similarly, it was proposed to request cleaning settings from a data memory in dependence on crop conditions and target guidelines. The setting values output by the automation system usually stem from settings that an experienced operator would make under similar conditions or that the respective driver had stored for himself for later reuse (EP 0 928 554 A1), or that can be derived from a distinct user behavior of a number of drivers (DE 103 29 932 A1). The procedure used in the prior art to detect certain crop properties determined by sensor values and to set an actuator by means of predetermined algorithms has, however, the disadvantage that the sensors do not always operate precisely enough and many parameters affecting the transport or processing of the crop cannot be detected or can only insufficiently be detected by a sensor. This leads to the setting of the operating parameter based on the sensor value not always leading to optimum operating results during harvesting in practice.

For this reason, one usually provides operator interfaces with which an operator can override or fine-tune an operating parameter controlled by a sensor-based automation system (EP 0 928 554 A1). The operator is, so to speak, an observer who observes the result of the crop transport or crop processing and provides appropriate, possibly corrective, feedback inputs to the control. A sensor, such as a loss sensor in the case of a cleaning setting (EP 3 141 102 A1) or a camera for observation of the crop flow in a cutter head (EP 2 143 316 A1), can also serve as observer for the result.

The inputs of the observer usually serve as feedback values, which merely serve to override or to correct the setting values output by the sensor-based automation system, but do not change the algorithm used by it. Accordingly, the algorithm does not learn from the inputs of the observer and does not become improved.

In addition, the algorithm cannot adjust to the individual desires of the operator. In particular, it can be established that in the setting of many machine parameters of a combine harvester or a different harvesting machine such as a forage harvester, different control strategies are possible, all of which lead to an acceptable outcome. One example of this is the height adjustment of a reel. There are various height settings for the reel depending on the crop conditions which, however, can also be differently selected by different operators according to their experience. If now an automatic control should only choose reel settings that do not correspond to the ideas of the relevant operator, the acceptance of the control will not be good and the operator will rather tend to switch off the control. A fine tuning in accordance with EP 0 928 554 A1 in this case is also not practical, since the control must also output different reel heights for different sensor values such, for example, the height of the standing crop. Moreover, these would need to be corrected by the operator and thus continuously at each resetting by the automation. A similar freedom of decision of the operator results in the setting of the blower speed and the blower plate spacing of a forage harvester.

It was also proposed that an operator can provide inputs regarding his satisfaction with the current harvesting process via an interface by means of which an algorithm can improve the setting of operating parameters of a harvesting machine (EP 1 371 278 A2). However, these are not normal inputs, which an operator would make to override or correct the current process, but rather a separate processing step during an optimizing procedure for initial setup of a combine harvester at the beginning of harvest.

It was also proposed, in the case of a combine harvester, to make available sensors for crop and field parameters and the result of the crop processing process, the measurement values of which are sent to a fuzzy interference system, which controls threshing and cleaning parameters based on the signals of the sensors for crop and field parameters (EP 1 277 388 A1). The measurement values for the result of the crop processing process serve to automatically adapt the parameters used by the fuzzy interference system. Here the adjustment of the algorithm (i.e., the parameters of the fuzzy interference system) is based on continuously detected measurement values for the result of the crop processing process, which on the one hand requires suitable sensors which are not available for all of the required parameters, and on the other hand requires high computational power, since the measurement values are continuously arriving and thus also need to be continuously processed.

Finally, it was proposed to make available to an operator, via an operator interface, a possibility for selection of an operating behavior of a machine (DE 101 22 672 A1). Such an operating behavior is in particular the reaction of an actuator of the machine to an operator input. This procedure would, however, require that suitable operating behaviors be stored for the respective operator of the machine and the operator must in addition know which of the stored operating behaviors is suitable for him. Such a procedure thus cannot be used in practice in the example of the reel height control.

Thus, there is a need for a system for control of an operating parameter of an agricultural harvesting machine that is an improvement over the prior art, a harvesting machine outfitted therewith, and a corresponding method, so as to avoid or at least reduce the disadvantages in the art.

SUMMARY

In a first embodiment of the present disclosure, a system for automatic control of an operating parameter of a crop transport or processing device of an agricultural harvesting machine includes a sensor for detection of at least a property of the crop or a parameter affected by the property, a control device, which can be operated, by means of the signals of the sensor using an algorithm, to determine successive control signals for control of an actuator that affects the operating parameter of the crop transport or processing device, which interacts with the sensed crop, and an interface for input of corrective inputs for the operating parameter by an observer monitoring the operating result of the crop transport or processing device, where the control device is connected to the interface and can be operated to override the control signals sent to the actuator by means of the received corrective inputs and, by means of the signals of the sensor and the corrective inputs associated with it, to automatically modify the algorithm used by the control device.

In other words, a control device controls an actuator, which generates a control signal for control of an operating parameter of a crop transport or processing device on the basis of signals of a sensor for detection of some property of the crop or a parameter affected by the crop, for which an algorithm is used. In addition, corrective inputs are continuously received from an observer monitoring the operating result of the crop transport or processing device, which inputs serve to override the control signal. The algorithm is modified when necessary (i.e., when the corrective signals imply the need for this) by means of the signals of the sensor and the corrective inputs so that the algorithm becomes adjusted to the corrective inputs and the latter are no longer necessary after a certain learning time.

The control device in particular can be operated to modify the algorithm continuously. Through this, a reset button for a change of operators is no longer necessary and an automatic adjustment to a changed operator behavior, which can be a result of changed harvesting conditions, for example, can also take place.

The control device can include an evaluator, which can be operated to calculate a relevance of the corrective inputs while taking into account their frequency and magnitude. Moreover, the control device can include an adjuster, which can be operated to modify the algorithm while taking into account the relevance of the corrective input.

The control device can be operated to command at least two states of the actuator and the adjuster can be operated to affect the signals of the sensor associated with the states or the states of the actuator.

It is also conceivable that the control device can be operated for use as an algorithm of a neural network, in which weightings learned by means of operator inputs of an experienced operator are used in advance and the adjuster can be operated to modify the learned weightings. The sensor can interact with the crop or an element interacting with the crop upstream or downstream from the crop transport or processing device.

The interface can include an operator input device or a sensor. In the former case, the observer is thus a human observer who monitors the crop transport or processing device by means of his own senses (especially visually) and provides the corrective inputs if there are deviations of a target behavior known to him. In another case, the interface is connected to a sensor which acts as the observer and when necessary provides the corrective inputs.

The operating parameter controlled by the control device can be the forward position or height of a reel serving as crop transport device.

The system can be used on any harvesting machine, such as combine harvesters or forage harvesters, in which an operating parameter of a blower or a grain processing device can be controlled.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
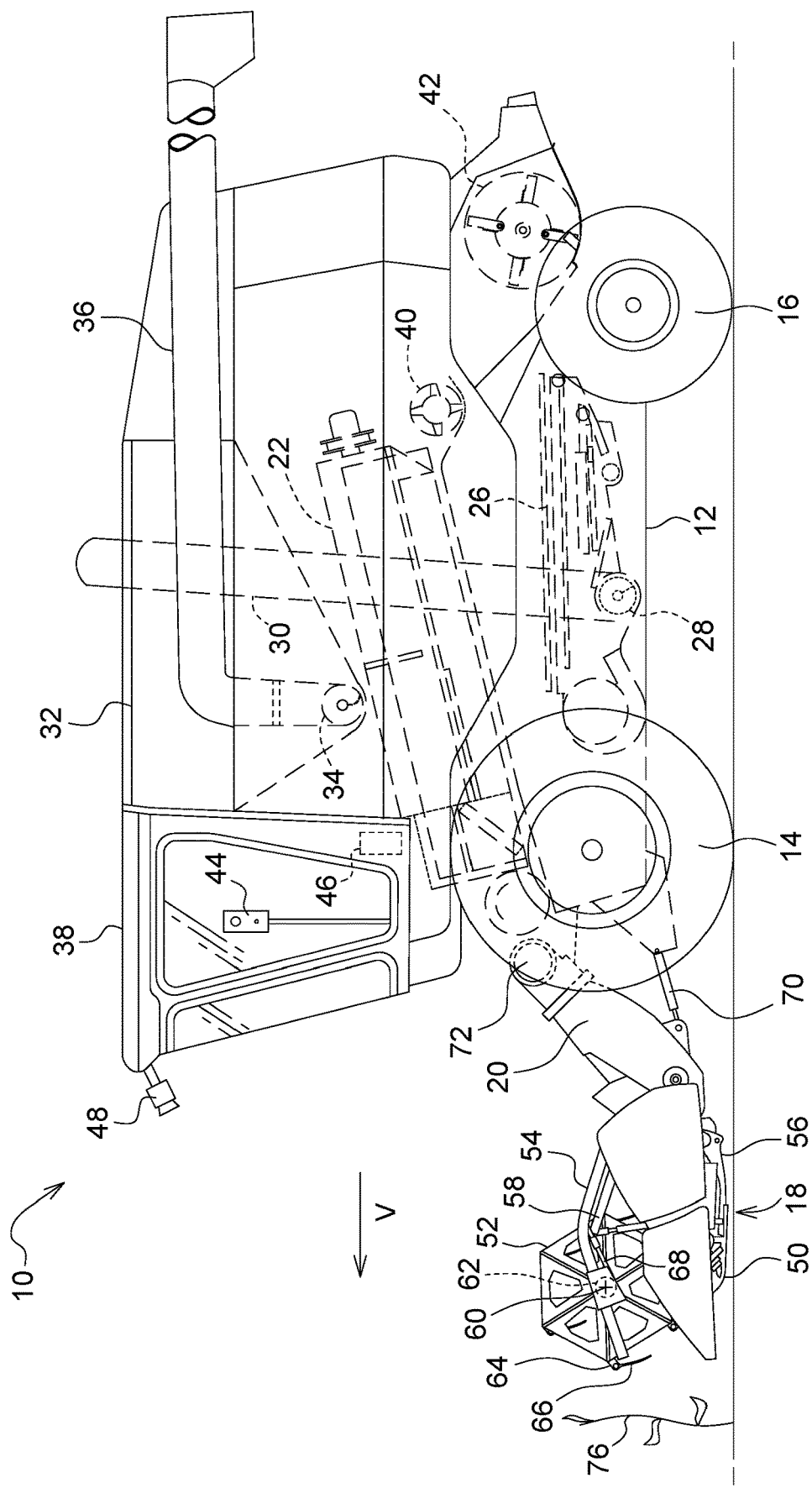
FIG. 1 is a schematic side view of a harvesting machine.

FIG. 1 shows a self-propelled harvesting machine 10 in the form of a combine harvester with a chassis 12, which is supported on the ground by driven front wheels 14 and steerable rear wheels 16 and is moved forward by the wheels. The wheels 14, 16 are set into rotation by a drive means that is not shown so as to move the harvesting machine 10 over, for example, a field that is to be harvested. In what follows, directional data such as forward and backward refer to the direction of travel V of the harvesting machine 10 in harvesting operation, which runs to the left in FIG. 1.

A crop head 18 in the form of a cutter head is separably connected to the front region of the harvesting machine 10 in order to harvest crops 76 in the form of cereal grain or other threshable grain from the field in a harvesting operation and to transport it upward and to the rear by an inclined conveyor assembly 20 to an axial thresher unit 22. The mixture containing grain and contaminants passing through the thresher concave in the axial thresher unit 22 goes to a cleaning device 26. Grain cleaned by the cleaning device 26 is transported by means of a grain auger 28 to a grain elevator 30, which transports it to a grain tank 32. The cleaned grain can be unloaded from the grain tank 32 by an unloading system with a transverse auger 34 and an unloader designed as an auger transport assembly 36. The crop residues produced by the axial thresher 22 are sent by a transport drum 40 to a straw chopper 42, which chops them and distributes them over the field over the width of the cutter bar 18. The systems are driven by an internal combustion engine and monitored and controlled by an operator from a driver cab 38. The shown axial thresher 22 with one or more axial threshing and separating rotors is only one example and could, for example, be replaced by a tangential thresher unit consisting of one or more threshing drums and a subsequent straw walker or separating rotor(s).

The cutter head 18 includes a reciprocating knife bar 50 which extends essentially over the entire width of the cutter head 18. A reel 52 is disposed on the cutter head 18 above the knife bar 50 and likewise extends essentially over the entire width of the cutter head 18. The outer ends of the reel 52 are mounted on arms 54, of which only one is shown in FIG. 1. The arms 54 comprise rearward ends, which can pivot about axles that run transverse to the forward direction V on frame 56 of the cutter head 18, which frame extends over the width of the cutter head 18 and the arms extending forward therefrom. Each arm 54 is linked to an actuator 58 in the form of a hydraulic cylinder, which is pivotably mounted on frame 56 and on arm 54. The arms 54 and thus the reel 52 are raised and lowered by adjusting (retracting and extending) the actuator 58.

Tine carriers 64, which likewise extend over the width of the cutter head 18 and on which tines 66 are mounted, are supported on a central tube 62 that can be rotated about its central axis 60. A second actuator 68 in the form of a hydraulic cylinder serves for horizontal adjustment of the reel 52 by shifting a bearing of the tube 62 along the arm 54. The cutter head 18 additionally comprises transverse conveyor means, which cannot be seen in FIG. 1, but which can be designed as auger conveyors or a conveyor belt so as to transport the crop 76 cut by the cutter bar to the middle of the cutter head 18 and to feed it into the inclined conveyor 20 through a rear opening in frame 56. The height of the cutter head 18 above the ground is set by a third actuator 70, which pivots the inclined conveyor 20 and thus the cutter head 18 mounted separably thereon about a horizontal axis 72 that is oriented transverse to the forward direction with respect to the frame 12 of the harvesting machine 10.

In the prior art, the height adjustment of the reel 52 is done by an operator, for whom there is an operator interface unit 44 with buttons in an operator's cab 38. The operator interface 44 is connected to a control device 46, which in turn controls the actuator 58. If the operator presses the up button of the operator interface 44, the reel 52 is raised and it becomes lowered as long as the operator actuates the down button of the operator interface 44. If the crop 76 is standing erect, the operator positions the reel 52 a little in front of the cutter bar 50 of the cutter head 18 in the horizontal direction (by additional buttons of the operator interface 44, which control the second actuator 58 via the control unit 44).

The vertical height is usually set by the operator so that the tines 66 of the reel 52 engage the stalk a little under the heads of the standing crop. If the reel 52 is set too high, the crop 76 can collect on the cutter bar 50. If the reel height is correct, the cutter bar 50 can readily cut the crop 76, and the plant stalks with the heads will fall in front toward the transverse conveyor. The forward position of the reel 52 is dependent on the relevant yield, i.e., the reel 52 is set further to the front at higher throughputs. In the case of laid grain, the reel 52 must be guided closer to the cutter bar 50 in the vertical direction and, under severe conditions, also horizontally closer so as to transport the plants in the direction of the cutter bar 50 and then to the transverse conveyor. If laid grain needs to be harvested only over a part of the width of the cutter head 18 while standing grain comes in over the rest of the width, a very low reel setting leads to poor crop flow and to losses at the standing grain. In this case an intermediate position is used so as to bring in both the laid grain and the standing stems in a reasonable way.

Accordingly, the continuous adjustment of the position of the reel 52 to the current crop conditions is a tedious job for the operator, which can no longer be optimally performed after a few hours at the latest, which leads to non-optimum harvesting results. An automation is indeed known in the prior art (EP 2 681 984 A1), but it has the disadvantage that it outputs preset values, which do not appear to be acceptable for all operators, since for given crop conditions different operators will choose, according to their experience, different height adjustments for the reel 52, all of which lead to serviceable results. Some operators, for given conditions, prefer different heights of the reel 52 and they change the heights more often or for different changes of height of the crop 76 than do other operators.

Figure 2:
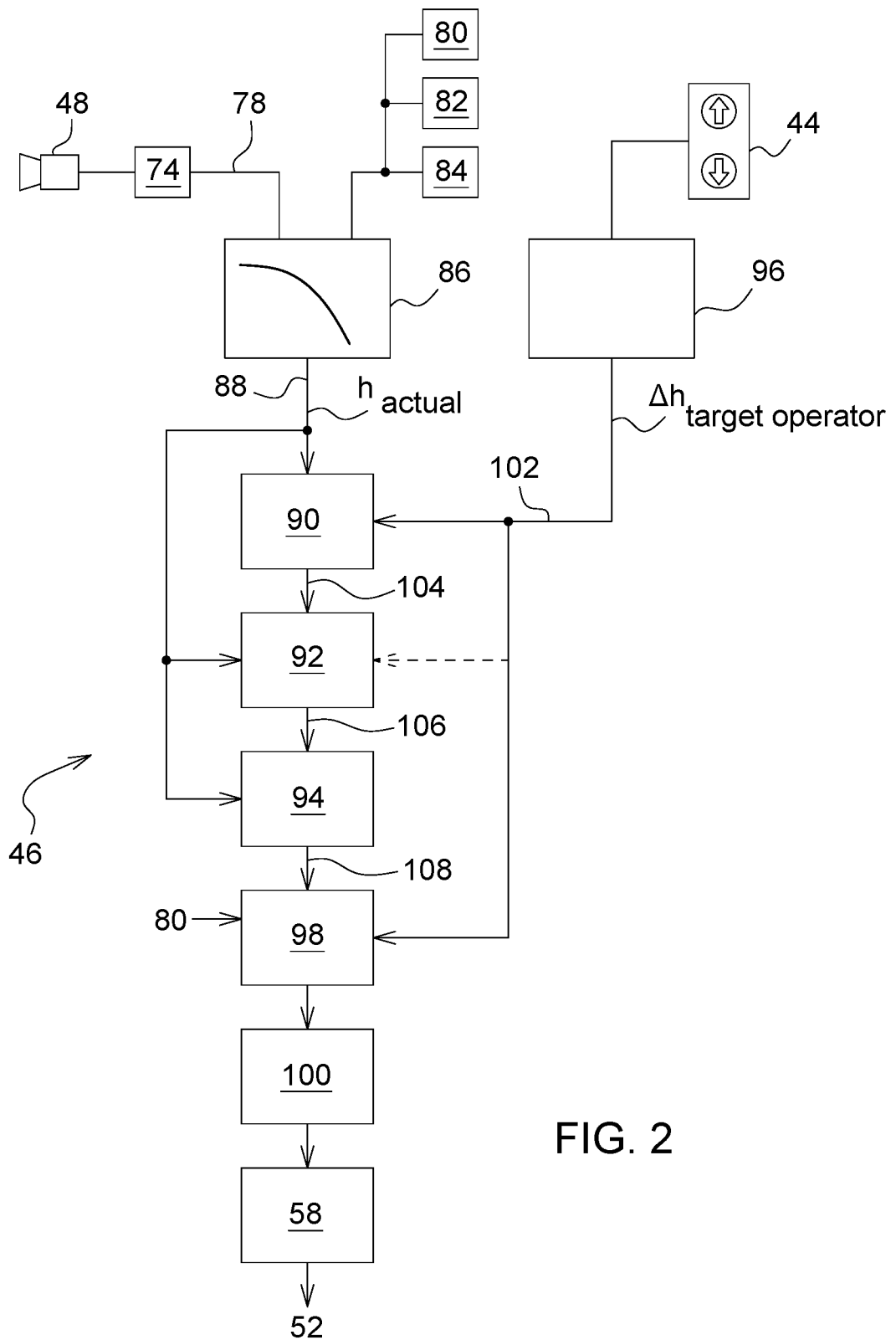
FIG. 2 is a schematic representation of a system for control of an operating parameter of a crop transport device of the harvesting machine.

In order to ease the work of the operator and to relieve her/him from the continuous adjustment of the height of the reel 52, the harvesting machine 10 is outfitted with a system for automatic control of the height of the reel 52, which is shown schematically in FIG. 2. The system comprises a sensor 48, which is designed as a camera with an image processing system 74. The camera views the stand of crop 76 in front of the cutter head 18. The image processing system analyzes the image signals from the camera and outputs signals 78, which represent the height of the top of the crop 76 above the ground. An appropriate sensor 48 is described in EP 2 681 984 A1. The sensor 48 can also be designed as a laser time-of-flight rangefinder, as described in DE 10 2008 043 716 A1, or DE 10 2011 017 621 A1, or DE 10 2011 085 380 A1. In addition, the rotary speed of the reel 52 can be manually or automatically controlled.

A number of feedback sensors 80 to 84 detect the setting of the actuators 58, 68, and 70. The feedback sensors 80 to 84 can detect the setting of the actuators 58, 68, 70 themselves, i.e., be designed as optical or magnetic sensors, which interact with the piston rod of the actuator 58, 68, 70, or they can detect the translational or rotary position of a movable element of actuator 58, 68, 70, for example, the arm 54 about its rear axis of rotation.

The signals 78 of the sensor and the signals of the feedback sensors 80 to 84 are sent to a signal processing unit 86, which computes, by means of the known geometry of the cutting head 18 and the harvesting machine 10, including the inclined conveyor 20, and the signals of the feedback sensors 80 to 84, the height at which a reference point of the reel 52 is situated above the ground. If the cutter head 18 is to be moved with respect to the inclined conveyor 20 by an additional actuator about a horizontal axis running transverse to the forward direction V (see DE 295 19 842 U1), its position may be detected by an additional feedback sensor and sent to the signal processing unit 86 to be taken into account by it. The reference point can be, for example, the lower end of a tine 66, which happens to be in the frontmost position like the tine 66 in FIG. 1. This height is subtracted from the height of the top of the crop 76, which is detected by means of the signal 78. The signal processing unit 86 can comprise a low pass filter in order to reduce noise portions of the output signal 88. The signal 88 output by the signal processing unit 86 accordingly corresponds to a measured vertical distance ($h_{actual}$) between the reference point of the reel 52 and the top of the crop 76.

In addition to the measured vertical distance ($h_{actual}$) between the reference point of the reel 52 and the top of the crop 76, the signals 88 also contain information about the absolute height of the crop 76 or the proportion of laid grain in front of the cutter head 18. This information can be evaluated by the sensor 48 and the image processing system 74 and made available in signal 88.

The signal 88 is sent as an input signal to an evaluator 90, an adjuster 92, and a converter 94, which are components of the control unit 46. The evaluator 90 and optionally the adjuster 92 additionally receive signals 102 from a pre-processing circuit 96, which is connected to the operator interface 44. The signals 102 report which corrective inputs, in the form of height adjustment desires ($\Delta h_{target,\ operator}$) for reel 52, the operator may have input directly.

The signals 102 are also sent to the evaluator 90. The latter also receives the signals 88 and determines a relevance of the corrective inputs (i.e., the signals 102). The evaluator 90 accordingly has the task of identifying how important the corrective inputs are. The evaluator 90 can in this case start from the assumption that the corrective inputs are all the more relevant, the more frequently they arrive, since this is an important indicator that the operator is highly dissatisfied with the height of the reel 52 that is currently automatically set. Also, a greater level (duration) of corrective inputs indicates that the operator is highly dissatisfied with the height of the reel 52 that is currently automatically set. On the other hand, if no corrective inputs arrive over a long period of time, the evaluator 90 can assume that the operator is in agreement with the currently set height of the reel 52. If corrective inputs again arrive after a lengthy correction-free period, the evaluator 90 will thus initially ignore them and only after many corrective inputs have arrived will assume that crop properties have changed or an operator change has taken place and evaluate the incoming corrective inputs more highly.

Since the evaluator 90 also receives the signal 88, including the measured vertical distance ($h_{actual}$) between the reference point of the reel 52 and the top of the crop 76 and the proportion of laid grain in front of the cutter head 18, the evaluator 90 can also take these parameters into account in evaluating the corrective inputs. In this case, it can be taken into account that the signals 88 may be shifted in time with respect to the signals 102, even though they concern the same crop 76, and accordingly compensation can be made for this time offset. The evaluator 90 can accordingly detect, for example, the laid grain part at which the operator begins lowering the reel 52. The evaluator 90 can also detect the different states of the cutter head 18, which can be divided into the intake of normal, standing grain and the intake of laid grain and possibly the intake of damaged, i.e., partially compacted or bent grain, and evaluate the relevant corrective inputs differently. The evaluator 90 can employ substantially known procedures to evaluate the corrective inputs, for example, probabilistic procedures (for example, Bayes algorithm), or can be designed as a Kalman filter.

Accordingly, the evaluator 90 outputs signals 104 that indicate to what extent a corrective input can be seen as operator dissatisfaction with the current control behavior of the control device 46. The signals 104 can be sent to the adjuster 92, which can additionally be supplied with the signals 88 or 102. The adjuster 92 is configured to modify an algorithm used by the converter 94 in dependence on the signals 104 so that in the end the operator, after his corrective behavior was learned and absorbed, need make only a few or no more corrective inputs.

The adjuster 92 accordingly sends signals 106 to modify the algorithm used by converter 94, with which algorithm the converter 94 converts the signals 88 to control signals 108, which control the actuator 58 via a driver 98 and a valve unit 100. The driver 98 also receives feedback signals from sensor 80 to detect the current position of the actuator 58 (in order to be able to bring it into the desired position) and the signals 102, which optionally override the signals 108.

In light of all this, the control device 46 during operation learns, by means of the corrective inputs of the operator, how the algorithm used by the converter, which algorithm appropriately represents a relationship between the signals 88 and the control signals 108, is to change so that the control device 46 correspondingly meets the desires of the operator. The control signals 108, especially in the initial period after a fresh start of the harvesting machine 10 or if there is a change of the control behavior of the operator, which can be due to changing crop conditions or a change of operators, are based in a substantially known way only on the signals 88 which are overridden by means of signals 102, and the algorithm becomes successively adjusted through the corrective inputs There are various possibilities in the selection of the algorithm and its adjustment to the operator behavior. For instance, the adjuster 92 can select a relationship between the signals 88 and the control signals 108 by means of which the converter 94 generates the control signals 108 during operation from among a plurality of stored relationships, so as to select the relationship that comes closest to the desires of the relevant operator.

In another embodiment, the algorithm can foresee two or more states of the actuator 52 (which can be, for example, a lower setting for laid grain and an upper setting for a normal crop stand) and the adjuster 92 can be operable to affect the signals 88 associated with the states or the states of the actuator 58 (i.e., the height setting of the reel 52). In this embodiment, the evaluator 90 can detect if the corrective data represent an enhancement of the setting selected by converter 94, i.e., a slight upward or downward adjustment of the height of the reel 52, and in this case change the output values of the converter 94 (states of the actuator 58 for the height setting of the reel 52). Also, the evaluator 90 can detect if the corrective inputs are a correction of the setting selected by the converter 94, i.e., a coarser up or down adjustment of the height of the reel 52 in particular for the case that the differentiation between laid grain and standing crop was not correct and in this case change the input values of the converter 94 (the signals 98 associated with the states).

In another embodiment, a program that implements a neural network, in which weightings learned by means of operator inputs from an experienced operator are used in advance and where the adjuster 94 modifies the learned weightings, runs in converter 94.

As a result, one obtains an automatic height control of reel 52, which automatically adaptively adjusts to the behavior of the relevant operator and whose acceptance will be higher than a conventional height control.

Finally, it should be noted that the operator interface 44 could be replaced or supplemented by a sensor system, which monitors the activity of the reel 52 and, for example, detects wrapping of crop on the reel 52 (see EP 2 143 316 A1). The sensor system can be implemented by the sensor 48 and the image processing 74 and on demand make available the corrective inputs (signal 102), which could possibly be supplemented by the inputs of the operator.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A system for automatic control of an operating parameter of a crop transport or processing device of an agricultural harvesting machine, comprising:
   a sensor configured to detect at least one property of a crop or a parameter affected by the operating property,
   a control device disposed in communication with the sensor to receive signals therefrom, the control device operable by means of the signals from the sensor using an algorithm to determine successive control signals for control of an actuator, wherein the control signals affect the operating parameter of the crop transport or processing device that interacts with the sensed crop; and
   an operator interface for input of corrective inputs for the operating parameter;
   wherein, the control device is connected to the interface and is operable to override the control signals sent to the actuator by means of the received corrective inputs;
   wherein, the control device is operable to automatically modify the algorithm used by the control device by means of the signals of the sensor and the corrective inputs associated therewith.

2. The system of claim 1, where the control device is configured to continuously operably modify the algorithm.

3. The system of claim 1, wherein the control device comprises an evaluator configured to operably calculate a relevance of the corrective inputs in view of a frequency and magnitude of the corrective inputs.

4. The system of claim 3, wherein the control device comprises an adjuster configured to operably modify the algorithm in view of the relevance of the corrective inputs.

5. The system of claim 4, wherein:
   the control device operably commands at least two states of the actuator; and
   the adjuster operably affects the signals of the sensor that are associated with the at least two states of the actuator.

6. The system of claim 4, wherein the control device is operated as an algorithm of a neural network in which weightings learned by means of operator inputs from an experienced operator are used in advance and where the adjuster is configured to operably modify the learned weightings.

7. The system of claim 1, wherein the sensor is configured to interact with the crop or an element interacting with the crop upstream or downstream from the crop transport or processing device.

8. The system of claim 1, wherein the interface comprises an operator interface device or a sensor.

9. The system of claim 1, wherein the operating parameter controlled by the control device is a forward position or height of a reel that serves as a crop transport device.

10. A harvesting machine, comprising:
    a chassis;
    a plurality of wheels for supporting the chassis;
    a system for automatic control of an operating parameter of a crop transport or processing device of the harvesting machine, the system comprising:
       a sensor configured to detect at least one property of a crop or a parameter affected by the operating property,
       a control device disposed in communication with the sensor to receive signals therefrom, the control device operable by means of the signals from the sensor using an algorithm to determine successive control signals for control of an actuator, wherein the control signals affect the operating parameter of the crop transport or processing device that interacts with the sensed crop; and
       an operator interface for input of corrective inputs for the operating parameter;
       wherein, the control device is connected to the interface and is operable to override the control signals sent to the actuator by means of the received corrective inputs;
       wherein, the control device is operable to automatically modify the algorithm used by the control device by means of the signals of the sensor and the corrective inputs associated therewith.

11. The harvesting machine of claim 10, where the control device is configured to continuously operably modify the algorithm.

12. The harvesting machine of claim 10, wherein the control device comprises an evaluator configured to operably calculate a relevance of the corrective inputs in view of a frequency and magnitude of the corrective inputs.

13. The harvesting machine of claim 12, wherein the control device comprises an adjuster configured to operably modify the algorithm in view of the relevance of the corrective inputs.

14. The harvesting machine of claim 13, wherein:
    the control device operably commands at least two states of the actuator; and
    the adjuster operably affects the signals of the sensor that are associated with the at least two states of the actuator.

15. The harvesting machine of claim 13, wherein the control device is operated as an algorithm of a neural network in which weightings learned by means of operator inputs from an experienced operator are used in advance and where the adjuster is configured to operably modify the learned weightings.

16. The harvesting machine of claim 10, wherein the sensor is configured to interact with the crop or an element interacting with the crop upstream or downstream from the crop transport or processing device.

17. The harvesting machine of claim 10, wherein the interface comprises an operator interface device or a sensor.

18. The harvesting machine of claim 10, wherein the operating parameter controlled by the control device is a forward position or height of a reel that serves as a crop transport device.

19. A method for automatic control of an operating parameter of a crop transport or processing device of an agricultural harvesting machine, comprising:
- providing a sensor, an actuator, and a control device;
- detecting with the sensor at least one property of the crop or a parameter affected by the property;
- using an algorithm to successively determine control signals for control of the actuator by the control device via signals from the sensor, where the control signals affect the operating parameter of the crop transport or processing device that interacts with the sensed crop;
- obtaining corrective inputs for the operating parameter by an observer monitoring the operating result of the crop transport or processing device via an interface;
- connecting the control device to the interface;
- overriding the control signals sent to the actuator by the received corrective inputs; and
- automatically modifying by the control device the algorithm used by the control device via the signals of the sensor and the corrective inputs associated therewith.

* * * * *